UNITED STATES PATENT OFFICE 2,633,464

CRYSTALLIZATION OF STREPTOMYCINS

Leon J. Heuser, Robbinsville, N. J., assignor to Mathieson Chemical Corporation, New York, N. Y., a corporation of Virginia No Drawing. Application September 23, 1950, Serial No. 186,487

8 Claims. (Cl. 260—210)

This invention relates to the crystallization of streptomycins.

[The term "streptomycins," or "a streptomycin" identifies the genus (or a member of the genus) consisting of streptomycin, mannosidostreptomycin, and streptomycin complex.]

Streptomycins have been purified by various methods, the early methods being generally complicated and/or inefficient (and consequently expensive). Recently, simple, efficient and otherwise advantageous methods of purifying streptomycins have been provided, these improved methods being the subject of certain U. S. patent applications [Lott, Bernstein and Heuser applications Serial Numbers 767,851 and 767,852, filed August 9, 1947, now Patents Nos. 2,537,933 and 2,537,934, respectively, dated January 9, 1951]. These improved purification methods are based on the findings that: the streptomycins interact with surface-active agents of the organically-substituted polybasic-inorganic-acid type to form salt-type combinations which are much less soluble in water (and more soluble in certain organic solvents) than the streptomycins; and that such salt-type derivatives of the streptomycins may be recovered and converted into simple mineral-acid salts of streptomycins in purified form.

One of these methods (cf. Patent No. 2,537,933) essentially comprises intimately contacting an aqueous solution of the impure streptomycin e. g., a primary streptomycin-containing liquid, or an aqueous solution of a partially-purified streptomycin, such as the eluate from the charcoal adsorbate) with a surface-active agent of the organically-substituted polybasic-inorganic-acid type and a substantially water-immiscible organic solvent for soaps (including invert soaps), preferably with a substantially water-immiscible aliphatic alcohol; separating the organic solvent phase; and recovering the salt-type derivative of the streptomycin therein and/or converting it to a water-soluble salt of the streptomycin (as by intimately contacting the organic solvent solution with an aqueous, water-soluble, relatively-strong acid, and recovering the aqueous phase).

The other of these methods (cf. Patent No. 2,537,934) essentially comprises: treating the impure streptomycin with the surface-active agent in a solvent for the reactants (especially water); recovering the formed, relatively water-insoluble salt-type combination derived from the streptomycin and surface-active agent (by filtration, for example); and converting the latter combination into a water-soluble salt of the streptomycin (as by dissolving the combination in a solvent therefor, treating the solution with an aqueous, water-soluble relatively-strong acid, and recovering the formed water-soluble salt of the streptomycin).

The water-soluble salt (of the streptomycin) obtained by such improved purification treatment is considerably purer than the streptomycin treated, and the recovery of streptomycin activity is of a high order (it being possible to obtain uniformly high yields of relatively-pure streptomycin complex, for example, having a potency above about 400 units/mg.).

It is the object of this invention to provide certain crystalline streptomycins, and advantageous methods of obtaining them.

The crystalline streptomycins of this invention are the sesquisulfates and sesquiphosphates, these crystalline salts being of a particular tautomeric form, as explained hereinafter. [These crystalline streptomycins may be obtained by treatment of certain of the aforementioned salt-type combinations of streptomycins and surface-active agents with sulfuric acid and phosphoric acid under certain conditions, but the yields are unsatisfactory, and the products are often objectionably colored.] The advantageous methods of this invention essentially comprise: mixing (A) an organic-solvent solution of a salt-type combination derived from the streptomycin and a member of the group consisting of

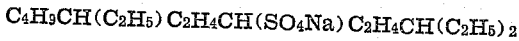

and

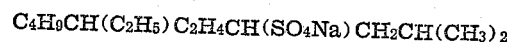

[preferably the former], the organic solvent being substantially water-immiscible and being a nonsolvent for the desired salt of streptomycin, and (B) an aqueous solution of a weak-base salt of an acid of the group consisting of sulfuric and phosphoric; and recovering the formed crystalline salt of the streptomycin. Crystalline sesquisulfates and sesquiphosphates of the streptomycins, especially streptomycin sesquisulfate, are thus obtained in high yield.

By virtue of their high purity and low coloration, the crystalline streptomycins obtained in the practice of this invention are especially suitable for conversion to the corresponding dihydrostreptomycins by catalytic hydrogenation or electrolytic reduction. Moreover, these crystalline streptomycins may be converted to the dihydrostreptomycins while in the form of a crystal slurry.

The crystalline compounds of this invention differ from the corresponding amorphous compounds in a respect other than purity or crystalline form. Thus, there are indications that they are also different tautomeric forms of the amorphous compounds. These indications include the facts that: crystalline streptomycin sesquisulfate, for example, is difficultly soluble in water at its own pH, whereas the amorphous compound is readily soluble at that pH; pure amorphous streptomycin sesquisulfate cannot be crystallized by conventional procedures; aging of the tergitates enhances the yield of the crystalline compound; and crystalline streptomycin sesquisulfate may be obtained from crystalline streptomycin hydrochloride, but not from pure amorphous streptomycin hydrochloride, by treatment with sulfuric acid or guanidine sulfate.

The following examples are illustrative of the invention:

*Example 1*

20 g. substantially-dry streptomycin tergitate [containing about 5% water, obtained from streptomycin and $C_4H_9CH(C_2H_5)C_2H_4CH(SO_4Na)C_2H_4CH(C_2H_5)_2$ (Tergitol Penetrant 7) as described in application Serial No. 767,852, referred to hereinbefore], or a corresponding amount of the wet tergitate, is dissolved in 100 ml. n-butanol. The solution is filtered, and the filtrate washed with 100 ml. 0.3% sulfuric acid; and the butanol phase is recovered and added to 100 ml. of a 5% aqueous solution of guanidine sulfate at such rate as to prevent any precipitation (over an about five-minute period) while agitating, the guanidine sulfate solution having priorly been adjusted to pH 3.2 by addition of dilute sulfuric acid and heated to 65–70° C. [Heating is not essential for crystallization; but without heating, smaller crystals are formed.] The reaction mixture is then allowed to cool to 25° C. over about a 1½ hour period, during which time streptomycin sesquisulfate precipitates from the aqueous phase as crystals of the coarseness of table salt. The crystals are filtered off, and dried under vacuum (yield about 70%). Assays: chemical—about 800 units/mg.; bio-assay—about 833 units/mg. [The coarseness of the crystals enables them to be filtered and worked with ease on a perforated basket centrifuge.]

The streptomycin sesquisulfate thus obtained is insoluble in methanol, and difficultly soluble in water at its own pH (in contrast with amorphous streptomycin sesquisulfate), but gradually dissolves at that pH and readily dissolves at about pH 7. In the presence of excess sulfate ion, equilibrium is reached between the crystal and dissolved form; but once the crystals have been dissolved at higher pH, the addition of sulfuric acid or sulfates does not bring about crystallization. An aqueous solution of the streptomycin sesquisulfate may be obtained by treating a slurry of the crystals in water with $Ba(OH)_2$ or with a synthetic resin acid-adsorbent or anion exchanger (e. g., Amberlite IR-4B, a modified phenol formaldehyde polyamine condensate) until neutral pH is obtained, warming the mixture, and filtering. Freeze-drying of this solution yields streptomycin sesquisulfate having a potency (bio-assay) of about 860 units/mg. The product may be used per se as a therapeutic agent, or converted into pure dihydrostreptomycin (sesquisulfate) in good yield.

*Example 2*

Replacement of the guanidine sulfate employed in Example 1 with an equimolecular quantity of ammonium sulfate does not (qualitatively) affect the production of streptomycin sesquisulfate.

*Example 3*

Replacement of the 5% aqueous solution of guanidine sulfate employed in Example 1 with half the volume of a 10% solution does not (qualitatively) affect the production of streptomycin sesquisulfate.

*Example 4*

The guanidine sulfate solution employed in Example 1 is replaced with an equivalent amount of a 5% aqueous solution of guanidine phosphate; and methanol is added to the separated aqueous phase until cloudiness occurs, and the solution allowed to stand. The streptomycin sesquiphosphate gradually crystallizing out is recovered by filtration or centrifugation. It is soluble in water, insoluble in methanol, and slightly soluble in 50% aqueous methanol. Its analysis (C, 34.31%; H, 6.30%; N, 13.35%; and P, 6.58%) is in close agreement with the theoretical.

*Example 5*

Replacement of the n-butanol employed in Example 1 by amyl acetate, and addition of methanol to the separated aqueous phase until cloudiness occurs does not (qualitatively) affect the production of streptomycin sesquisulfate; nor does addition of methanol to the n-butanol employed in Example 1 (e. g., in a ratio of 1:5 by volume).

*Example 6*

Replacement of the streptomycin tergitate employed in Example 1 by an equal weight of mannosidostreptomycin tergitate yields crystalline mannosidostreptomycin sesquisulfate. The mannosidostreptomycin tergitate may be obtained, for example, by dissolving 1.4 g. mannosidostreptomycin trihydrochloride in 75 ml. water, adding 7.5 ml. of a 25% solution of Tergitol Penetrant 7 in water, while agitating; and, after the reaction mixture has stood for about an hour, filtering off the precipitated tergitate and drying it.

The preferred organic solvent for the practice of this invention in the production of streptomycin sesquisulfate is n-butanol, inasmuch as this salt is quite insoluble in water saturated with n-butanol.

The preferred weak-base salts of sulfuric and phosphoric acids for the purposes of this invention are the ammonium salts, especially the amine salts, and notably the guanidine salts; the term "ammonium" being employed herein in its generic sense, comprehending organically-substituted-ammonium. Among the other utilizable weak-base salts of sulfuric and phosphoric acids are aniline sulfate and pyridine sulfate.

When a crude streptomycin tergitate is employed, the organic solvent solution thereof is preferably washed with very dilute aqueous sulfuric acid or phosphoric acid before treatment to convert the tergitate to the sulfate or phosphate respectively, e. g., with a less than 0.5% (preferably about 0.3%) sulfuric acid; this treatment removing impurities and resulting in a less-colored crystalline product.

The crystals obtained may be further purified by washing them with aqueous methanol (of the order of 50–90%).

Preferably, the tergitate is used in substantially-dry form. Preferably also, the tergitate (especially the wet tergitate) is allowed to age for a period of the order of 5–25 days before treatment to obtain the crystalline salts. Thus, aging of the wet streptomycin tergitate in a cold room (under conditions preventing air-drying) for about 8 days resulted in as high a yield of crystalline streptomycin sesquisulfate as obtained when using the dry tergitate, and approximately double the yield obtained when using the wet tergitate without aging. Preferably also, the tergitate is prepared by precipitation to a chemical assay end point, addition of excess Tergitol resulting in a lower yield of the crystalline salts.

For optimum yields, there should be no delay in further processing after dissolving the tergitate in the organic solvent.

The invention may be variously otherwise embodied within the scope of the appended claims.

I claim:

1. The method of obtaining a crystalline salt of a streptomycin, which comprises: mixing (A) an organic-solvent solution of a salt-type combination derived from the streptomycin and a member of the group consisting of $C_4H_9CH(C_2H_5)C_2H_4CH(SO_4Na)C_2H_4CH(C_2H_5)_2$ and $C_4H_9CH(C_2H_5)C_2H_4CH(SO_4Na)CH_2CH(CH_3)_2$ the organic solvent being substantially water-immiscible and being a nonsolvent for the desired salt of streptomycin, and (B) an aqueous solution of a weak-base salt of a member of the group consisting of sulfuric acid and phosphoric acid; and recovering the formed crystalline salt of the streptomycin.

2. The method of obtaining crystalline streptomycin sesquisulfate, which comprises: mixing (A) an organic-solvent solution of a salt-type combination derived from streptomycin and $C_4H_9CH(C_2H_5)C_2H_4CH(SO_4Na)C_2H_4CH(C_2H_5)_2$ the organic solvent being substantially water-immiscible and being a nonsolvent for streptomycin sesquisulfate, and (B) an aqueous solution of a sulfuric acid salt of a weak base; and recovering the formed crystalling streptomycin sesquisulfate.

3. The method defined by claim 2, in which the sulfuric acid salt of a weak base is an ammonium sulfate.

4. The method defined by claim 2, in which the sulfuric acid salt of a weak base is guanidine sulfate.

5. The method defined by claim 2, in which the organic solvent essentially comprises n-butanol.

6. The method defined by claim 2, in which the organic solvent solution is washed with very dilute aqueous sulfuric acid before treatment with the sulfuric acid salt.

7. The method defined by claim 2, in which the salt-type combination employed is substantially-dry.

8. The method defined by claim 2, in which the salt-type combination employed is a wet material which has been aged for a period of the order of 5 to 25 days.

LEON J. HEUSER.

REFERENCES CITED

The following references are of record in the file of this patent:

UNITED STATES PATENTS

| Number | Name | Date |
|---|---|---|
| 2,462,175 | Folkers | Feb. 22, 1949 |
| 2,531,869 | Alburn et al. | Nov. 28, 1950 |
| 2,537,933 | Lott et al. | Jan. 9, 1951 |
| 2,537,934 | Lott et al. | Jan. 9, 1951 |
| 2,537,941 | Regna et al. | Jan. 9, 1951 |